US012588003B2

(12) United States Patent
Guduru et al.

(10) Patent No.: US 12,588,003 B2
(45) Date of Patent: Mar. 24, 2026

(54) SYSTEMS AND METHODS FOR DYNAMIC RADIO CHANNEL CONFIGURATION IN A RADIO ACCESS NETWORK

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Yuexin Dong, Bridgewater, NJ (US); David Taft, Keller, TX (US); Raquel Morera Sempere, Weehawken, NJ (US)

(73) Assignee: Verizon Patent and Licensing Inc., Basking, Ridge, NJ (US)

( * ) Notice: Subject to any disclaimer, the term of this patent is extended or adjusted under 35 U.S.C. 154(b) by 413 days.

(21) Appl. No.: 18/174,611

(22) Filed: Feb. 25, 2023

(65) Prior Publication Data

US 2024/0292375 A1     Aug. 29, 2024

(51) Int. Cl.
H04W 72/02 (2009.01)
H04L 5/00 (2006.01)
H04W 72/543 (2023.01)

(52) U.S. Cl.
CPC ......... H04W 72/02 (2013.01); H04W 72/543 (2023.01); H04L 5/0007 (2013.01)

(58) Field of Classification Search
CPC .. H04W 72/02; H04W 72/543; H04L 5/0007; H04L 41/16
See application file for complete search history.

(56) References Cited

U.S. PATENT DOCUMENTS

2020/0119895 A1* 4/2020 Choi ..................... H04W 24/08
2020/0413386 A1* 12/2020 Feng .................... H04B 1/3838
2021/0204227 A1* 7/2021 Bergljung ............. H04W 52/38
2022/0408300 A1* 12/2022 Bellamkonda ........ H04W 88/10
2023/0345292 A1* 10/2023 Pateromichelakis .......................
                                              H04W 28/0268

(Continued)

OTHER PUBLICATIONS

Third Generation Partnership Project, "Technical Specification Group Radio Access Network; NR; Radio Resource Control (RRC) Protocol Specification (Release 17)," 3GPP TS 38.331 V17.2.0 (Sep. 2022).

(Continued)

*Primary Examiner* — Jae Y Lee
*Assistant Examiner* — Nick Anon Sundara

(57) ABSTRACT

A system described herein may receive a set of attributes associated with a particular User Equipment ("UE"), such as a location of the UE, Quality of Service ("QoS") parameters, or UE power class. The system may identify a set of radio access network ("RAN") configuration parameters based on the received set of attributes associated with the particular UE, wherein the RAN configuration parameters include radio frequency ("RF") channel configuration parameters such as an orthogonal frequency-division multiplexing ("OFDM") slot format. The system may provide the identified set of RAN configuration parameters to the RAN, and the RAN may utilize the RF channel configuration parameters included in the identified set of RAN configuration parameters to configure one or more channels between the RAN and the particular UE.

20 Claims, 8 Drawing Sheets

(56) References Cited

U.S. PATENT DOCUMENTS

2023/0413202 A1\*  12/2023  Guduru ............. H04W 28/0268
2024/0283290 A1\*   8/2024  Elshafie ................. H02J 50/20

OTHER PUBLICATIONS

Third Generation Partnership Project, "Technical Specification Group Radio Access Network; NR; Physical Layer Procedures for Control (Release 17)," 3GPP TS 38.213 V17.4.0 (Dec. 2022).
Third Generation Partnership Project, "Technical Specification Group Radio Access Network; Evolved Universal Terrestrial Radio Access (E-UTRA); Physical Channels and Modulation (Release 17)," 3GPP TS 36.211 V17.2.0 (Jun. 2022).
Third Generation Partnership Project, "Technical Specification Group Services and System Aspects; System Architecture for the 5G System (5GS); Stage 2 (Release 17)," TS 23.501 V17.6.0 (Sep. 2022).
Third Generation Partnership Project, "Technical Specification Group Services and System Aspects; Procedures for the 5G System (5GS); Stage 2 (Release 17)," TS 23.502 V17.6.0 (Sep. 2022).
Third Generation Partnership Project, "Technical Specification Group Services and System Aspects; Policy and Charging Control Framework for the 5G System (5GS); Stage 2 (Release 17)," 3GPP TS 23.503 V17.6.0 (Sep. 2022).
ShareTechnote, "5G/NR—Waveform," ShareTechnote.com, available at https://www.sharetechnote.com/html/5G/5G_Waveform.html, visited Feb. 7, 2023.

\* cited by examiner

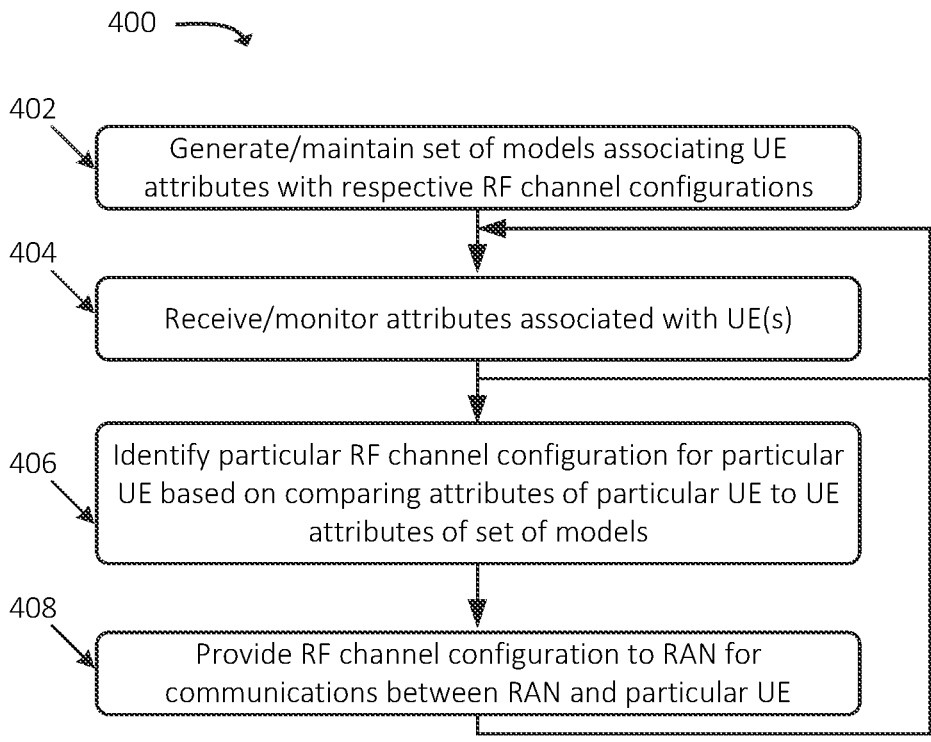

400

402 — Generate/maintain set of models associating UE attributes with respective RF channel configurations 404 — Receive/monitor attributes associated with UE(s)

406 — Identify particular RF channel configuration for particular UE based on comparing attributes of particular UE to UE attributes of set of models 408 — Provide RF channel configuration to RAN for communications between RAN and particular UE

Bus
810

SYSTEMS AND METHODS FOR DYNAMIC RADIO CHANNEL CONFIGURATION IN A RADIO ACCESS NETWORK

BACKGROUND

Radio access networks ("RANs") may serve as a wireless interface between User Equipment ("UEs"), such as mobile telephones, Internet of Things ("IoT") devices, etc. and a core network and/or other types of networks. Wireless communications between RANs and UEs may operate in the time and frequency domains. For example, the RAN may use orthogonal frequency-division multiplexing ("OFDM") techniques or other modulation/demodulation techniques, in which different frequencies or frequency bands may be for communicating with different UEs at different times and/or may be used for either uplink or downlink communications at different times.

BRIEF DESCRIPTION OF THE DRAWINGS

FIG. 4 illustrates an example process for dynamically selecting a radio channel configuration for a UE communicatively coupled to a RAN, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the dynamic determination of RAN configuration parameters, including radio channel configuration parameters, for different UEs based on various factors, such as attributes of respective UEs and/or of traffic sent and/or received by such UEs via the RAN. The radio channel configuration parameters may include OFDM parameters, such as OFDM slot patterns, or other suitable parameters. Different radio channel configuration parameters may provide different service attributes. For example, a first set of radio channel configuration parameters may provide relatively better coverage or reliability than a second set of radio channel configuration parameters, while the second set of radio channel configuration parameters may provide relatively better traffic throughput than the first set of radio channel parameters. As such, embodiments described herein may provide for the configuration of radio channels between respective UEs and the RAN that are tailored to attributes of the UEs and/or traffic associated with such UEs, thereby providing an enhanced user experience for users of such UEs.

Figure 1:
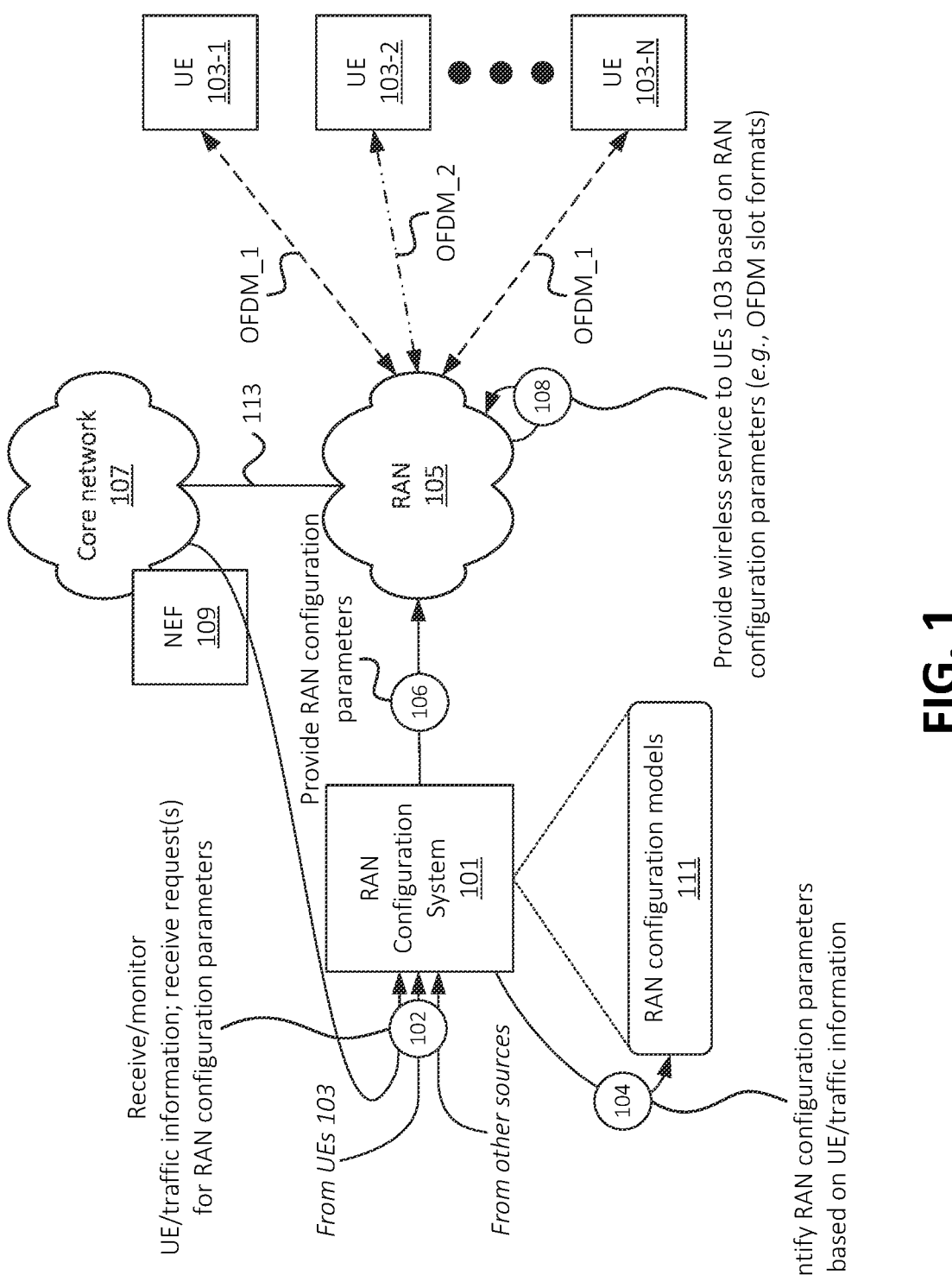
FIG. 1 illustrates an example overview of one or more embodiments described herein.

As shown in FIG. 1, for example, RAN Configuration System ("RCS") 101 may receive and/or monitor (at 102) information regarding one or more UEs 103, such as UEs 103-1, 103-2, 103-N, etc. that are connected to RAN 105. The received information may include Key Performance Indicator ("KPI") monitoring information, alerts, metrics, analytics, and/or other types of information from core network 107 (e.g., via NEF 105) and/or from other sources.

RCS 101 may receive (at 102) the KPI monitoring information, alerts, metrics, analytics, and/or other types of information from core network 107 (e.g., via an exposure element such as Network Exposure Function ("NEF") 109, a Service Capability Exposure Function ("SCEF"), etc.) and/or from other sources. RCS 101 may have previously registered with NEF 109, such as by exchanging authentication information (e.g., one or more keys, authentication tokens, etc., whereby NEF 109 may authenticate RCS 101 and/or vice versa), exchanging authorization information (e.g., whereby NEF 109 may maintain information regarding types of communications that RCS 101 is authorized to send or receive, elements of RAN 105 or core network 107 that RCS 101 is authorized to configure or monitor, or types of instructions or requests that RCS 101 is authorized to make), exchanging communication or routing information (e.g., an Internet Protocol ("IP") address or other suitable locator information associated with RCS 101 and/or NEF 109), or other suitable information based on which RCS 101 may communicate with NEF 109 or vice versa.

In some embodiments, RCS 101 registering with NEF 109 may include subscribing to particular types of information, and/or information from particular elements of RAN 105 and/or core network 107. For example, RCS 101 may subscribe to alerts, monitoring information, or the like from particular network functions of core network 107 or RAN 105, such as location monitoring or alerts associated with one or more particular UEs 103, usage monitoring or alerts associated with one or more particular UEs 103, monitoring information or alerts from an Access and Mobility Management Function ("AMF") of core network 107, monitoring information or alerts from one or more base stations of RAN 105, and/or other suitable information from one or more other elements of core network 107 and/or RAN 105.

RCS 101 may receive (at 102) the KPI information and/or other suitable information from one or more devices or systems that are external to RAN 105 or core network 107 (e.g., devices or systems that are not associated with a same address space or routing topology as RAN 105 or core network 107, that are reachable by core network 107 via one or more other networks such as the Internet, and/or are otherwise "external" to RAN 105 and core network 107). The other sources may include, for example, application servers or other devices or systems that collect, aggregate, process, and/or otherwise provide information as discussed herein. For example, the application servers may communicate with elements of core network 107 (e.g., via NEF 109), may communicate with one or more UEs 103 (e.g., via one or more application programming interfaces ("APIs") or applications executing at UEs 103), may communicate with other application servers (e.g., to aggregate or "stitch" diverse sets of information), and/or may otherwise receive or maintain information to provide to RCS 101. In some embodiments, RCS 101 may receive (at 102) information, associated with respective UEs 103, from such UEs 103 themselves. For example, one or more UEs 103 may communicate with RCS 101 via an API, an application executing at UEs 103, and/or other suitable communication pathways in order to provide some or all of the information discussed herein.

The information received by RCS 101 (e.g., from core network 107 via NEF 109, UEs 103, and/or from one or more other sources) may include granular information associated with particular UEs 103. For example, on a per-UE basis, RCS 101 may receive (at 102) information indicating usage via particular RATs or bands associated with a given UE 103. The usage information may include, for example, an amount of traffic, an amount of traffic that has been sent or received by a given UE 103 via a particular set of Quality of Service ("QoS") parameters (e.g., a particular network slice, a particular 5G QoS Identifier ("5QI") value, a particular QoS Class Identifier ("QCI") value, a particular set of UE Route Selection Policy ("URSP") rules, etc.). The particular network slice may be identified or indicated by a Network Slice Selection Assistance Information ("NSSAI") value, a Single-NSSAI ("S-NSSAI") value, and/or other suitable identifier. In some embodiments, the UE usage information may include traffic or application/service types or categories, such as voice call traffic, file download traffic, content streaming traffic, etc.

In some embodiments, the information received (at 102) by RCS 101 may include UE location information, such as a geographical location (e.g., specified as latitude and longitude coordinates, Global Positioning System ("GPS") coordinates, etc.) of a given UE 103 at a given time. In some embodiments, the UE location information may include cell or sector information (e.g., a cell identifier, a sector identifier, a tracking area ("TA"), etc.) of RAN 105 to which UE 103 is connected or that is otherwise in communication range of UE 103.

In some embodiments, the information received (at 102) by RCS 101 may be historical and/or monitored information, such as information that has been monitored or collected based on usage, events, etc. that have occurred in the past, and/or information that is being monitored in real time or near-real time. Additionally, or alternatively, the information received (at 102) by RCS 101 may include predicted or estimated information (e.g., predicted UE usage information, predicted UE location information, predicted network demand information, etc.), which has been predicted, estimated, and/or otherwise determined utilizing artificial intelligence/machine learning ("AI/ML") techniques or other suitable modeling or predictive techniques.

In some embodiments, RCS 101 may receive (at 102) requests for RAN configuration parameters. For example, one or more elements of RAN 105 may communicate with RCS 101 to request RAN configuration parameters for respective UEs 103 during a connection procedure, such as a Radio Resource Control ("RRC") connection establishment procedure or other suitable procedure. In some embodiments, such requests may be based on, for example, a request from a given UE 103 to connect to RAN 105 (e.g., to one or more base stations of RAN 105), a request from a given UE 103 to establish one or more communication sessions with core network 107 via RAN 105 (e.g., via a protocol data unit ("PDU") session between such UE 103 and a User Plane Function ("UPF") or other element of core network 107), and/or based on some other type of request or other suitable triggering event. In some embodiments, the information received or monitored (at 102) by RCS 101 may include information included in or otherwise derived from such requests. Additionally, or alternatively, RCS 101 may receive monitored information associated with one or more UEs 103 on an ongoing basis, and may identify based on the monitored information that RAN configuration parameters associated with such UEs 103 should be modified or changed (e.g., from a previous or existing set of configuration parameters via which such UEs 103 receive wireless service via RAN 105).

That is, RCS 101 may, in some embodiments, identify RAN configuration parameters for a particular UE 103 based on a request received by RCS 101, and/or may otherwise proactively identify RAN configuration parameters for a particular UE 103 based on monitoring UE and/or traffic attributes (or other suitable information) and determining that a currently implemented set of RAN configuration parameters for such UE 103 should be changed to another set of RAN configuration parameters. Such a situation may occur, for example, when attributes of UE 103 (such as location or other attributes) and/or of traffic sent or received by UE 103 change, when one or more RAN configuration models 111 (discussed in further detail below) maintained by RCS 101 change, and/or in other suitable scenarios.

In some embodiments, RCS 101 may receive (at 102) alerts, reports, etc. generated or determined by one or more elements of core network 107 and/or other external devices or systems. For example, an application server, a network function, etc. may monitor metrics, KPIs, etc. associated with UEs 103 and may identify particular events, conditions, or the like. For example, a UE location monitoring system may receive or monitor location information of one or more UEs 103, and may identify when the location of a given UE 103 satisfies one or more conditions (e.g., UE 103 has moved into a particular geographical region, UE 103 is moving at a particular speed or velocity, etc.). In such an example, the UE location monitoring system may provide (at 102) an alert regarding the identified conditions associated with the location of UE 103. Additionally, or alternatively, RCS 101 may receive (at 102) monitoring information (e.g., real time or near-real time monitoring information on a periodic or otherwise ongoing basis), and RCS 101 may identify one or more triggering events, conditions, or the like.

As another example, RCS 101 may receive attribute information associated with respective UEs 103 from one or more elements of RAN 105 and/or core network 107, based on information provided by UEs 103 (e.g., during a connection request, a communication session establishment request, etc.) and/or by core network 107 (e.g., from a UE information repository of core network 107 such as a Unified Data Management function ("UDM"), a Home Subscriber Server ("HSS"), a Unified Data Repository ("UDR"), etc.). Such attributes may include, for example, a power class of UEs 103 (e.g., indicating attributes of one or more radios of respective UEs 103, such as maximum transmit power of such UEs 103) or other attributes of UEs 103.

Based on the received (at 102) information, RCS 101 may determine (at 104) a respective set of RAN configuration parameters for each UE 103. For example, RCS 101 may maintain one or more RAN configuration models 111, which may include artificial intelligence/machine learning ("AI/ML") models or other suitable types of models, that associate particular UE and/or traffic attributes (e.g., as received (at 102) or determined by RCS 101) with particular set of RAN configurations. RCS 101 may, for example, identify a set of RAN configuration parameters that matches (e.g., within a threshold of similarity, based on a suitable similarity analysis) the monitored information associated with respective UEs 103.

Figure 2:
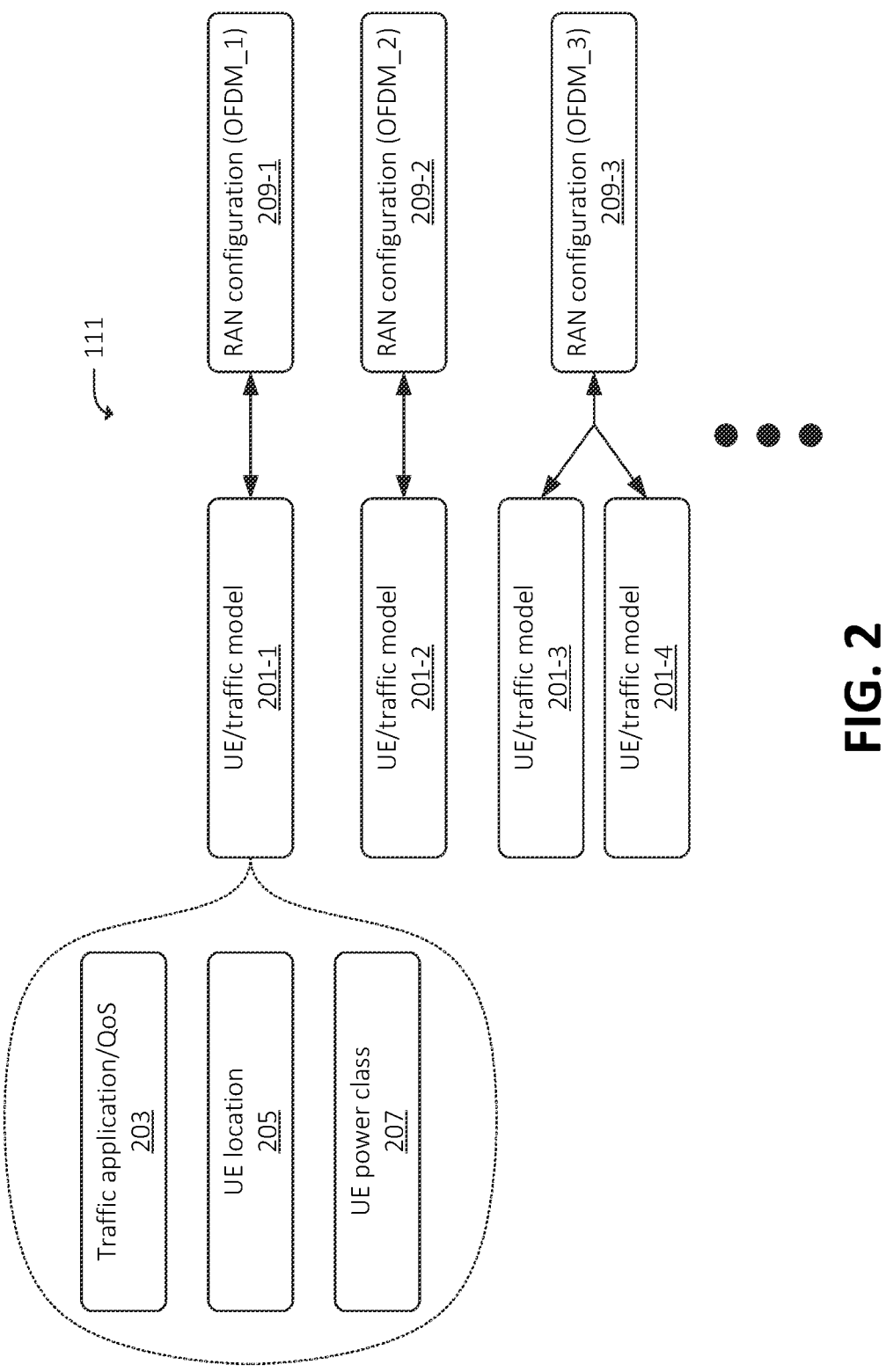
FIG. 2 illustrates an example of one or more RAN configuration models, in accordance with some embodiments.

FIG. 2 illustrates an example RAN configuration model 111, which may be used by RCS 101 to identify such RAN configuration parameters based on monitored or received UE and/or traffic information. As shown, RAN configuration model 111 may include one or more UE/traffic models 201 (e.g., UE/traffic models 201-1, 201-2, 201-3, 201-4, and so on). Each UE/traffic model 201 may include or may be associated with a particular set of values for different UE and/or traffic attributes, such as traffic application/QoS parameters 203, UE location information 205, UE power class information 207, and/or other suitable UE or traffic attributes.

Traffic application/QoS parameters 203 may, as noted above, indicate applications, application types (e.g., voice traffic, download traffic, content streaming traffic, etc.), network slices, Data Network Names ("DNNs"), and/or other attributes of traffic associated with a particular UE 103. In some embodiments, a particular set of traffic application/ QoS parameters 203 may specify a mix of different application types, network slices, etc. For example, in scenarios where a given UE 103 is sending or receiving traffic associated with multiple different application types, network slices, etc., a matching set of traffic application/QoS parameters 203 may indicate the same application types, network slices, etc. (and/or a set of application types, network slices, etc. that are similar beyond a similarity threshold to the application types, network slices, etc. of traffic associated with such UE 103). In some embodiments, a particular set of traffic application/QoS parameters 203 may specify a particular ratio or proportion of different application types, network slices, etc. For example, a first set of traffic application/QoS parameters 203 (e.g., associated with a first UE/traffic model 201-1) may specify a proportion of 60% of traffic associated with a first network slice and 40% of traffic associated with a second network slice, while a second set of traffic application/QoS parameters 203 (e.g., associated with a second UE/traffic model 201-2) may specify a proportion of 30% of traffic associated with the first network slice and 70% of traffic associated with a second network slice. Thus, in situations where monitored (e.g., at 102) information for a given UE 103 indicates that such UE 103 sends and/or receives traffic in the proportion of 59% of traffic associated with the first network slice and 41% of traffic associated with the second network slice, RCS 101 may determine (e.g., at 104) that the monitored information associated with UE 103 more closely matches the first set of traffic application/QoS parameters 203 than the second set.

As noted above, UE location information 205 may include an actual or predicted location of a given UE 103, such as a particular geographical location, a particular cell or sector of RAN 105, a TA of RAN 105, or other suitable location information. As also noted above, UE power class information 207 may indicate radio attributes (e.g., maximum transmit power) and/or other suitable attributes of a given UE 103. For example, UE power class information 207 may be specified in terms of identifiers or categories (e.g., "Power Class 1," "Power Class 2," etc.), raw power values, or other suitable representations.

As further shown, RAN configuration model 111 may include an association between RAN configurations 209 and respective UE/traffic models 201. For example, as shown, RAN configuration 209-1 may be associated with a first UE/traffic model 201-1 (e.g., a first set of traffic application/ QoS parameters 203, UE location information 205, and UE power class information 207), and RAN configuration 209-2 may be associated with a second UE/traffic model 201-2 (e.g., a second set of traffic application/QoS parameters 203, UE location information 205, and UE power class information 207). As also shown, RAN configuration 209-3 may be associated with multiple UE/traffic models 201 (e.g., UE/traffic models 201-3 and 201-4). In this manner, RAN configuration model 111 may indicate a one-to-one relationship between respective RAN configurations 209 and UE/traffic models 201, and/or a many-to-one relationship between respective RAN configurations 209 and UE/traffic models 201.

In some embodiments, RCS 101 may utilize AI/ML techniques (e.g., supervised and/or unsupervised learning techniques, neural networks, etc.) or other suitable techniques to generate, modify, refine, etc. the associations between respective RAN configurations 209 and UE/traffic models 201. In this manner, optimal RAN configurations 209 may be identified for different situations or UE parameters (e.g., UE/traffic models 201), thus providing an optimal user experience.

Figure 3:
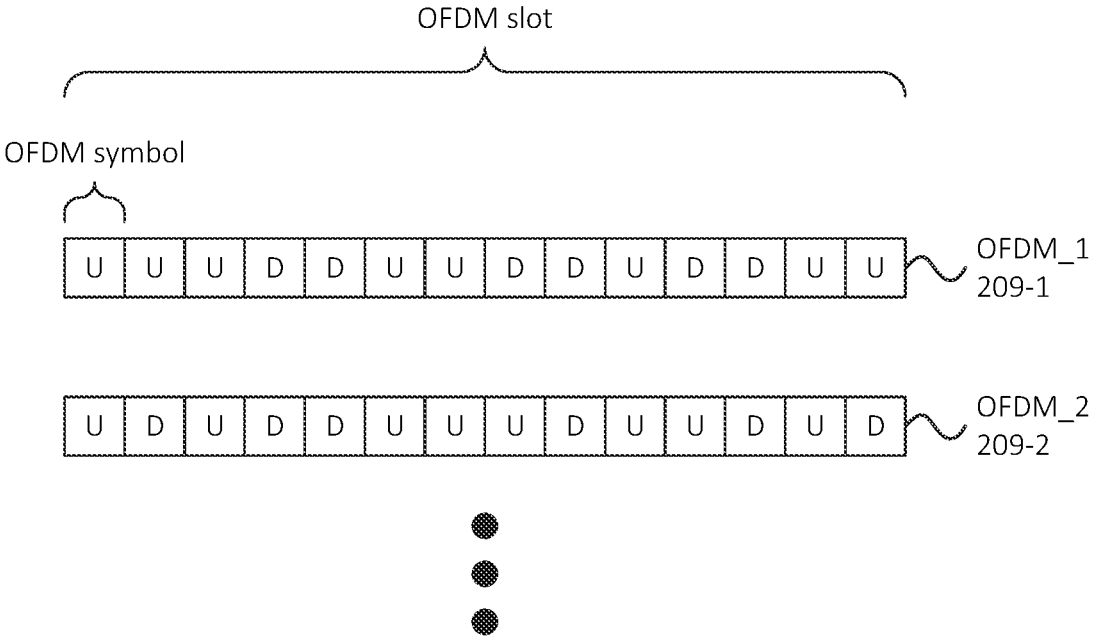
FIG. 3 illustrates an example of different OFDM slot formats, in accordance with some embodiments.

RAN configurations 209 may include, for example, OFDM configuration information, such as OFDM slot formats (e.g., where a first OFDM slot format is shown in the figures as "OFDM_1," a second OFDM slot format is shown in the figures as "OFDM_2," and so on). FIG. 3 illustrates an example of different OFDM slot formats (e.g., OFDM_1 and OFDM_2). As shown, each OFDM slot in an OFDM communication methodology may include a set of OFDM symbols (e.g., 14 OFDM symbols per slot and/or some other quantity in accordance with some embodiments). Each slot may refer to a particular temporal subdivision in a time domain (e.g., a 0.25-millisecond time window or some other suitable time window), while each symbol may refer to a particular frequency or frequency band (sometimes referred to as carriers or sub-carriers) within the particular slot. Different OFDM configurations may include different communication methodologies for different symbols within a given OFDM slot. For example, in some embodiments, a given symbol may be used for either uplink communications (e.g., communications from UE 103 to RAN 105, denoted in the figure as "U") or for downlink communications (e.g., communications from RAN 105 to UE 103, denoted in the figure as "D"). Symbols used for uplink communications may be used to implement a Physical Uplink Shared Channel ("PUSCH") or other suitable type of uplink channel between UE 103 and RAN 105, and symbols used for downlink communications may be used to implement a Physical Downlink Control Channel ("PDCCH") or other suitable type of downlink channel between UE 103 and RAN 105. In some embodiments, other communication methodologies may be used for a given symbol, such as a "flexible" symbol that may be used for either uplink or downlink communications. For the sake of simplicity, examples are described herein in the context of uplink and downlink symbols, but similar techniques may apply to flexible symbols or symbols with other suitable purposes or denotations.

In some embodiments, one example OFDM slot format (e.g., OFDM_1 and/or another OFDM slot format) may be a Cyclic Prefix OFDM ("CP-OFDM") slot format. In some embodiments, one example OFDM slot format (e.g., OFDM_2 and/or another OFDM slot format) may be a Discrete Fourier Transform-spread OFDM ("DFT-s-OFDM") slot format. The DFT-s-OFDM slot format may include a transform precoding operation to spread uplink data to reduce a peak-to-average power ratio of RF signals encoded using the DFT-s-OFDM format. In some embodiments, the DFT-s-OFDM may provide greater coverage than other OFDM formats, and may accordingly be selected in accordance with some embodiments for situations in which greater coverage is desirable (e.g., for fixed wireless access ("FWA") devices, network slices or other parameters for which coverage is prioritized, etc.). In some embodiments, the CP-OFDM format may be selected in accordance with some embodiments for situations in which greater throughput is desirable (e.g., network slices or other parameters for which throughput is prioritized).

Returning to FIG. 1, RCS 101 may provide (at 106) the selected RAN configurations 209 to RAN 105. For example, RCS 101 may provide, for each UE 103 (e.g., based on a connection request received from one or more UEs 103, based on identifying one or more triggers based on monitored information, and/or based on some other suitable event or condition), a respective set of RAN configurations 209. In this example, RCS 101 may have identified that UEs 103-1 and 103-N are associated with RAN configuration 209-1 (e.g., OFDM_1), while UE 103-2 is associated with RAN configuration 209-2 (e.g., OFDM_2). In some embodiments, RCS 101 may provide (at 106) the RAN configuration parameters to a RAN controller of RAN 105, one or more base stations of RAN 105, and/or other suitable element of RAN 105. In some embodiments, RCS 101 may be, may implement, and/or may be implemented by a RAN controller or other element of RAN 105.

RAN 105 may accordingly provide (at 108) wireless service to UEs 103 based on the receive RAN configurations 209, which may include communicating with respective UEs 103 according to respective OFDM slot formats (e.g., OFDM_1 and/or OFDM_2). Providing (at 108) the wireless service may include forwarding downlink communications, received from core network 107 (e.g., via backhaul link 113) to respective UEs 103, as well as forwarding uplink communications, received from respective UEs 103 (e.g., via an air interface implementing the respective OFDM slot formats or other suitable RAN configurations 209) to core network 107 via backhaul link 113.

FIG. 4 illustrates an example process 400 for dynamically selecting a radio channel configuration for a UE communicatively coupled to a RAN. In some embodiments, some or all of process 400 may be performed by RCS 101. In some embodiments, one or more other devices may perform some or all of process 400 in concert with, and/or in lieu of, RCS 101.

As shown, process 400 may include generating and/or maintaining (at 402) a set of models associating UE attributes with respective RF channel configurations. For example, as discussed above, RCS 101 may receive, maintain, refine, etc. (e.g., using AI/ML techniques or other suitable techniques) one or more RAN configuration models 111, which may include associations between sets of UE attributes (e.g., UE/traffic models 201) and respective RAN configurations 209, which may include RF channel configurations such as OFDM slot formats. As discussed above, different OFDM slot formats may include different arrangements, in the frequency domain, of frequencies, frequency bands, carriers, sub-carriers, etc. used for uplink or downlink communications between respective UEs 103 and RAN 105.

Process 400 may further include receiving and/or monitoring (at 404) attributes associated with one or more UEs 103. For example, RCS 101 may monitor, on an ongoing basis, attributes of UEs 103 that are connected to RAN 105. Additionally, or alternatively, RCS 101 may receive a request for RF channel configuration information, which may include attributes of one or more UEs 103, and/or based on which RCS 101 may retrieve attributes of such UEs 103. As discussed above, RCS 101 may receive, retrieve, etc.

attributes of UEs 103 from core network 107 (e.g., via NEF 109), RAN 105, one or more application servers, UEs 103 themselves, and/or some other suitable source. As discussed above, the attributes of UEs 103 may include QoS parameters (e.g., network slice information or other QoS information of existing communications between UE 103 and core network 107 and/or of requested communication sessions associated with UE 103), UE location information, UE power class, or other attributes of UEs 103 and/or of traffic associated with UEs 103.

Process 400 may additionally include identifying (at 406) a particular RF channel configuration for a particular UE 103 based on comparing attributes of the particular UE to UE attributes of the set of models. For example, RCS 101 may perform a similarity analysis to identify a set of UE attributes included in RAN configuration models 111 (e.g., a particular UE/traffic model 201) that matches or otherwise is similar (e.g., at least a threshold measure of similarity) to the attributes of the particular UE 103. RCS 101 may further identify a particular RAN configuration 209 (e.g., a particular OFDM slot format or other suitable RF channel parameters) that is associated with the identified set of UE attributes.

Process 400 may also include providing (at 408) the identified RF channel configuration to RAN 105, such that RAN 105 implements the RF channel configurations for wireless communications between RAN 105 and the particular UE 103. As discussed above, different UEs 103 connected to RAN 105 may be associated with different RF channel configurations, and may accordingly receive wireless service from RAN 105 based on particular attributes of UEs 103 and/or of traffic associated with such UEs 103. For example, as discussed above, RAN 105 may implement a PDSCH, a PUSCH, and/or other wireless channels based on the received RF channel configurations (e.g., different OFDM slot formats to implement the PDSCH, PUSCH, etc.).

Figure 5:
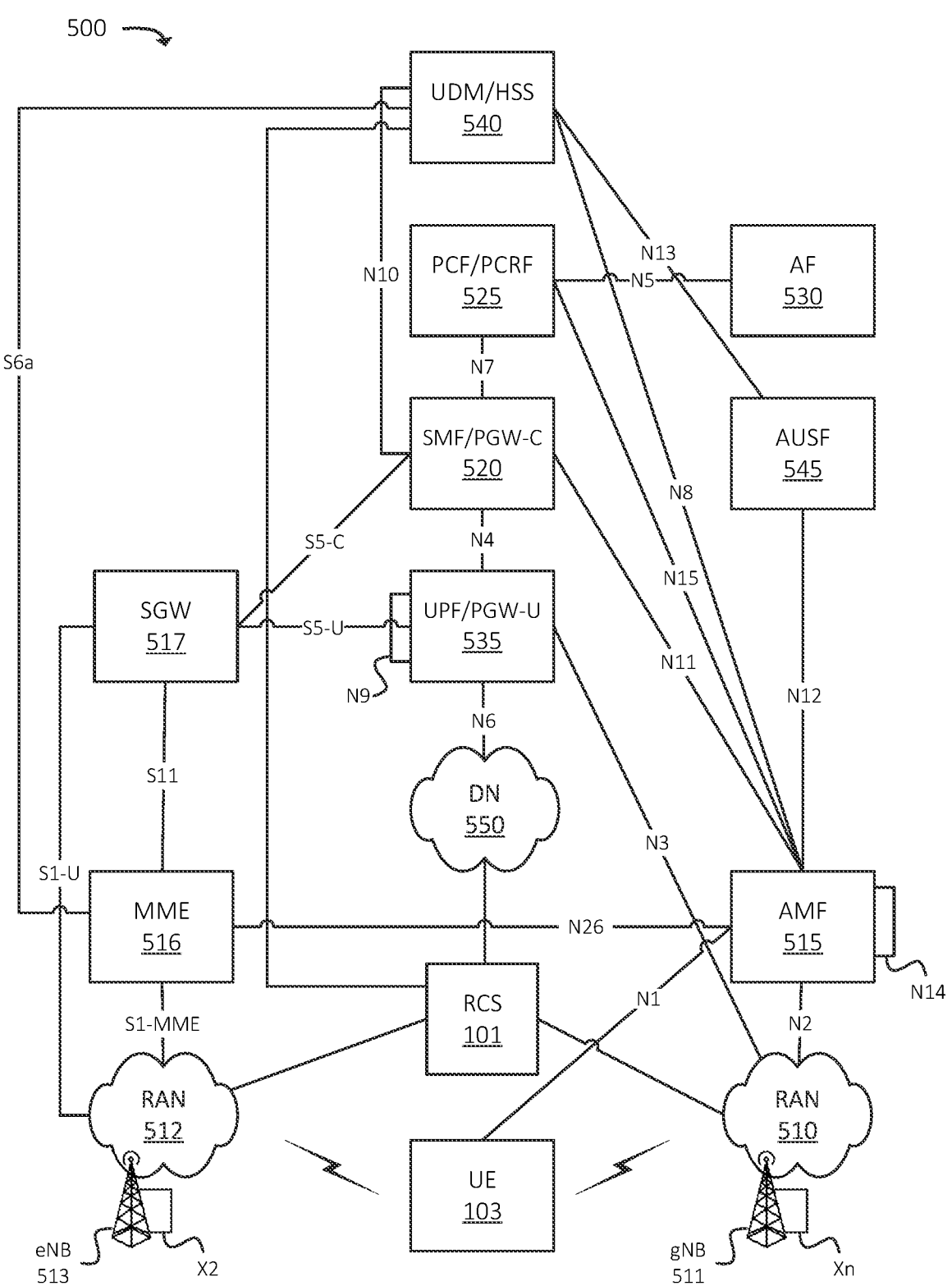
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 500 may represent or may include a 5G core ("5GC"). As shown, environment 500 may include UE 103, RAN 510 (which may include one or more Next Generation Node Bs ("gNBs") 511), RAN 512 (which may include one or more evolved Node Bs ("eNBs") 513), and various network functions such as AMF 515, Mobility Management Entity ("MME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, Unified Data Management ("UDM")/Home Subscriber Server ("HSS") 540, and Authentication Server Function ("AUSF") 545. Environment 500 may also include one or more networks, such as Data Network ("DN") 550. Environment 500 may include one or more additional devices or systems communicatively coupled to one or more networks (e.g., DN 550), such as RCS 101.

The example shown in FIG. 5 illustrates one instance of each network component or function (e.g., one instance of SMF/PGW-C 520, PCF/PCRF 525, UPF/PGW-U 535, UDM/HSS 540, and/or AUSF 545). In practice, environment 500 may include multiple instances of such components or functions. For example, in some embodiments, environment 500 may include multiple "slices" of a core network, where each slice includes a discrete and/or logical set of network functions (e.g., one slice may include a first instance of SMF/PGW-C 520, PCF/PCRF 525, UPF/PGW-U 535, UDM/HSS 540, and/or AUSF 545, while another slice may include a second instance of SMF/PGW-C 520, PCF/PCRF 525, UPF/PGW-U 535, UDM/HSS 540, and/or AUSF 545). The different slices may provide differentiated levels of service, such as service in accordance with different QoS parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. In some implementations, one or more devices of environment 500 may be physically integrated in, and/or may be physically attached to, one or more other devices of environment 500. Alternatively, or additionally, one or more of the devices of environment 500 may perform one or more network functions described as being performed by another one or more of the devices of environment 500.

Elements of environment 500 may interconnect with each other and/or other devices via wired connections, wireless connections, or a combination of wired and wireless connections. Examples of interfaces or communication pathways between the elements of environment 500, as shown in FIG. 5, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 5, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 500 may be, may include, may be implemented by, and/or may be communicatively coupled to RAN 105 and/or core network 107.

UE 103 may include a computation and communication device, such as a wireless mobile communication device that is capable of communicating with RAN 510, RAN 512, and/or DN 550. UE 103 may be, or may include, a radio-telephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 103 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 103 may communicate with one or more other elements of environment 500. UE 103 may communicate with RAN 510 via an air interface (e.g., as provided by gNB 511). For instance, RAN 510 may receive traffic (e.g., user plane traffic such as voice call traffic, data traffic, messaging traffic, etc.) from UE 103 via the air interface, and may communicate the traffic to UPF/PGW-U 535 and/or one or more other devices or networks. Further, RAN 510 may receive signaling traffic, control plane traffic, etc. from UE 103 via the air interface, and may communicate such signaling traffic, control plane traffic, etc. to AMF 515 and/or one or more other devices or networks. Additionally, RAN 510 may receive traffic intended for UE 103 (e.g., from UPF/PGW-U 535, AMF 515, and/or one or more other devices or networks) and may communicate the traffic to UE 103 via the air interface. In some embodiments, RAN 105 may be, may include, and/or may be implemented by RAN 510.

RAN 512 may be, or may include, a LTE RAN that includes one or more base stations (e.g., one or more eNBs 513), via which UE 103 may communicate with one or more other elements of environment 500. UE 103 may communicate with RAN 512 via an air interface (e.g., as provided by eNB 513). For instance, RAN 512 may receive traffic (e.g., user plane traffic such as voice call traffic, data traffic, messaging traffic, signaling traffic, etc.) from UE 103 via the air interface, and may communicate the traffic to UPF/PGW-U 535 (e.g., via SGW 517) and/or one or more other devices or networks. Further, RAN 512 may receive signaling traffic, control plane traffic, etc. from UE 103 via the air interface, and may communicate such signaling traffic, control plane traffic, etc. to MME 516 and/or one or more other devices or networks. Additionally, RAN 512 may receive traffic intended for UE 103 (e.g., from UPF/PGW-U 535, MME 516, SGW 517, and/or one or more other devices or networks) and may communicate the traffic to UE 103 via the air interface. In some embodiments, RAN 105 may be, may include, and/or may be implemented by RAN 512.

AMF 515 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 510 and/or gNBs 511, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 512 and/or eNBs 513, and/or to perform other operations.

SGW 517 may include one or more devices, systems, VNFs, CNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, CNFs, etc., that gather, process, store, and/or provide information in a manner described herein. SMF/PGW-C 520 may, for example, facilitate the establishment of communication sessions on behalf of UE 103. In some embodiments, the establishment of communications sessions may be performed in accordance with one or more policies provided by PCF/PCRF 525.

PCF/PCRF 525 may include one or more devices, systems, VNFs, CNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, CNFs, etc., that receive, store, and/or provide information that may be used in determining parameters (e.g., quality of service parameters, charging parameters, or the like) for certain applications.

UPF/PGW-U 535 may include one or more devices, systems, VNFs, CNFs, etc., that receive, store, and/or provide data (e.g., user plane data). For example, UPF/PGW-U 535 may receive user plane data (e.g., voice call traffic, data traffic, etc.), destined for UE 103, from DN 550, and may forward the user plane data toward UE 103 (e.g., via RAN 510, SMF/PGW-C 520, and/or one or more other devices). In some embodiments, multiple UPFs 535 may be deployed (e.g., in different geographical locations), and the delivery of content to UE 103 may be coordinated via the N9 interface (e.g., as denoted in FIG. 5 by the line marked "N9" originating and terminating at UPF/PGW-U 535). Similarly, UPF/PGW-U 535 may receive traffic from UE 103 (e.g., via RAN 510, RAN 512, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

UDM/HSS 540 and AUSF 545 may include one or more devices, systems, VNFs, CNFs, etc., that manage, update, and/or store, in one or more memory devices associated with AUSF 545 and/or UDM/HSS 540, profile information associated with a subscriber. AUSF 545 and/or UDM/HSS 540 may perform authentication, authorization, and/or accounting operations associated with the subscriber and/or a communication session with UE 103.

DN 550 may include one or more wired and/or wireless networks. For example, DN 550 may include an IP-based PDN, a wide area network ("WAN") such as the Internet, a private enterprise network, and/or one or more other networks. UE 103 may communicate, through DN 550, with data servers, other UEs 103, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 103 may communicate.

Figure 6:
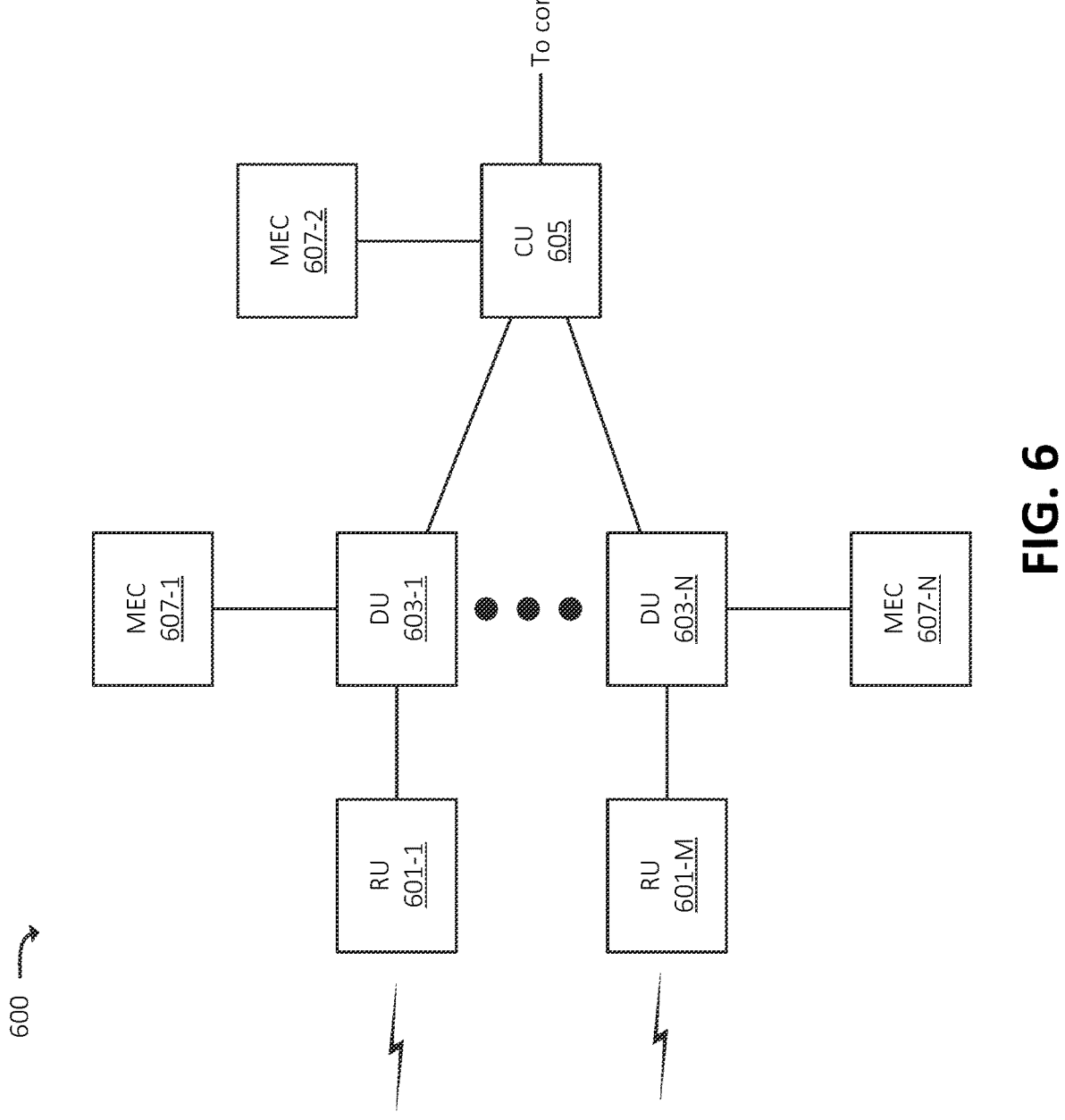
FIG. 6 illustrates an example arrangement of a RAN, in accordance with some embodiments.

FIG. 6 illustrates an example RAN environment 600, which may be included in and/or implemented by one or more RANs (e.g., RAN 510, RAN 512, or some other RAN). In some embodiments, a particular RAN may include one RAN environment 600. In some embodiments, a particular RAN may include multiple RAN environments 600. In some embodiments, RAN environment 600 may correspond to a particular gNB 511 of a 5G RAN (e.g., RAN 510). In some embodiments, RAN environment 600 may correspond to multiple gNBs 511. In some embodiments, RAN environment 600 may correspond to one or more other types of base stations of one or more other types of RANs. As shown, RAN environment 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 515 and/or UPF/PGW-U 535). In the uplink direction (e.g., for traffic from UEs 103 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 103, and may determine which DU(s) 603 should receive the downlink traffic. DU 603 may include one or more devices that transmit traffic between a core network (e.g., via CU 605) and UE 103 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 103.

RU 601 may include hardware circuitry (e.g., one or more RF transceivers, antennas, radios, and/or other suitable hardware) to communicate wirelessly (e.g., via an RF interface) with one or more UEs 103, one or more other DUs 603 (e.g., via RUs 601 associated with DUs 603), and/or any other suitable type of device. In the uplink direction, RU 601 may receive traffic from UE 103 and/or another DU 603 via the RF interface and may provide the traffic to DU 603. In the downlink direction, RU 601 may receive traffic from DU 603, and may provide the traffic to UE 103 and/or another DU 603.

One or more elements of RAN environment 600 may, in some embodiments, be communicatively coupled to one or more Multi-Access/Mobile Edge Computing ("MEC") devices, referred to sometimes herein simply as "MECs" 607. For example, DU 603-1 may be communicatively coupled to MEC 607-1, DU 603-N may be communicatively coupled to MEC 607-N, CU 605 may be communicatively coupled to MEC 607-2, and so on. MECs 607 may include hardware resources (e.g., configurable or provisionable hardware resources) that may be configured to provide services and/or otherwise process traffic to and/or from UE 103, via a respective RU 601.

For example, DU 603-1 may route some traffic, from UE 103, to MEC 607-1 instead of to a core network via CU 605. MEC 607-1 may process the traffic, perform one or more computations based on the received traffic, and may provide traffic to UE 103 via RU 601-1. In some embodiments, MEC 607 may include, and/or may implement, some or all of the functionality described above with respect to RCS 101, AF 530, UPF 535, and/or one or more other devices, systems, VNFs, CNFs, etc. In this manner, ultra-low latency services may be provided to UE 103, as traffic does not need to traverse DU 603, CU 605, links between DU 603 and CU 605, and an intervening backhaul network between RAN environment 600 and the core network.

Figure 7:
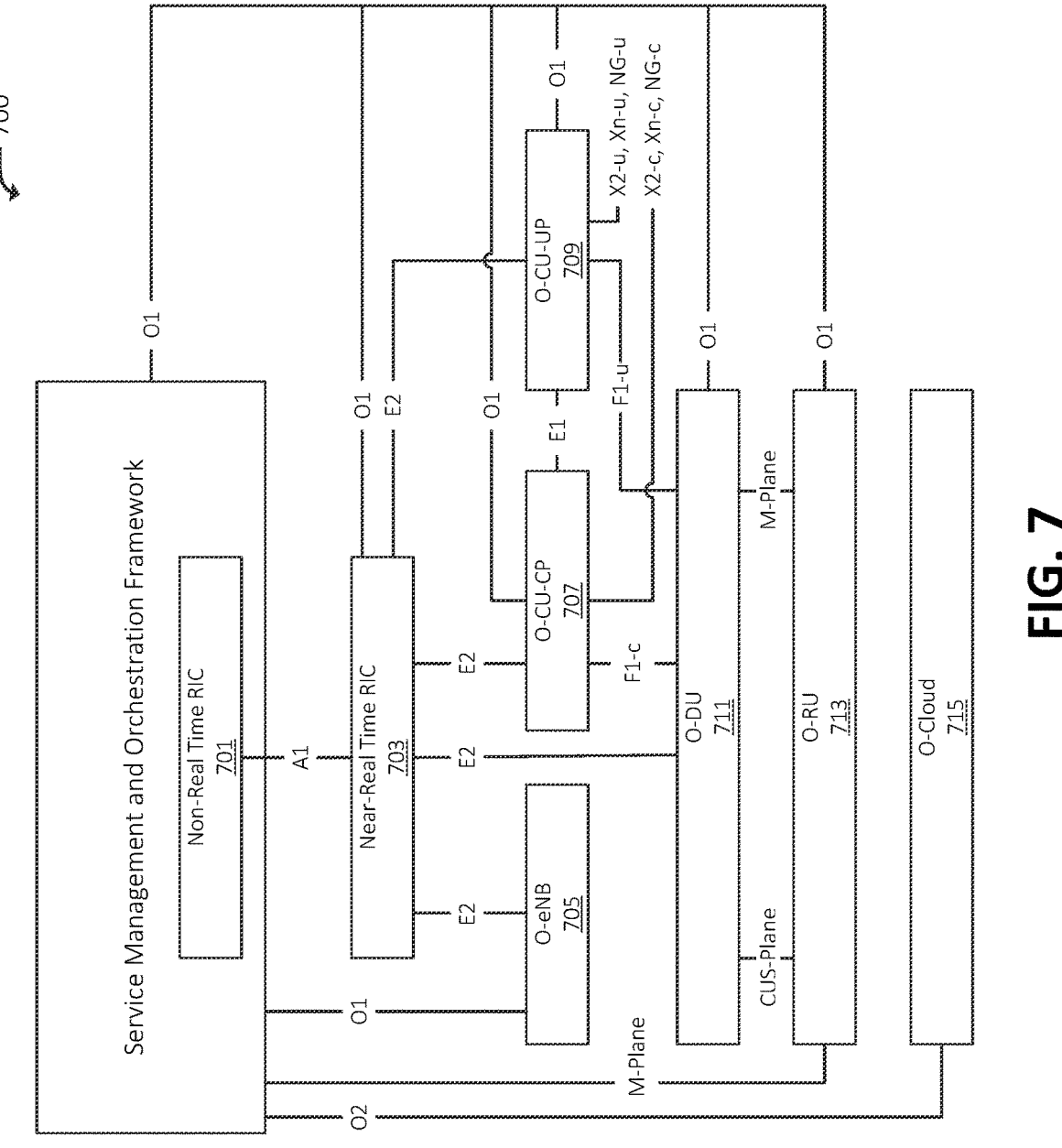
FIG. 7 illustrates an example arrangement of an Open RAN ("O-RAN") environment in which one or more embodiments, described herein, may be implemented.

FIG. 7 illustrates an example O-RAN environment 700, which may correspond to RAN 510, RAN 512, and/or DU network 600. For example, RAN 510, RAN 512, and/or DU network 600 may include one or more instances of O-RAN environment 700, and/or one or more instances of O-RAN environment 700 may implement RAN 510, RAN 512, DU network 600, and/or some portion thereof. As shown, O-RAN environment 700 may include Non-Real Time Radio Intelligent Controller ("RIC") 701, Near-Real Time RIC 703, O-eNB 705, O-CU-Control Plane ("O-CU-CP") 707, O-CU-User Plane ("O-CU-UP") 709, O-DU 711, O-RU 713, and O-Cloud 715. In some embodiments, O-RAN environment 700 may include additional, fewer, different, and/or differently arranged components.

In some embodiments, some or all of the elements of O-RAN environment 700 may be implemented by one or more configurable or provisionable resources, such as virtual machines, cloud computing systems, physical servers, and/or other types of configurable or provisionable resources. In some embodiments, some or all of O-RAN environment 700 may be implemented by, and/or communicatively coupled to, one or more MECs 527.

Non-Real Time RIC 701 and Near-Real Time RIC 703 may receive performance information (and/or other types of information) from one or more sources, and may configure other elements of O-RAN environment 700 based on such performance or other information. For example, Near-Real Time RIC 703 may receive performance information, via one or more E2 interfaces, from O-eNB 705, O-CU-CP 707, and/or O-CU-UP 709, and may modify parameters associated with O-eNB 705, O-CU-CP 707, and/or O-CU-UP 709 based on such performance information. Similarly, Non-Real Time RIC 701 may receive performance information associated with O-eNB 705, O-CU-CP 707, O-CU-UP 709, and/or one or more other elements of O-RAN environment 700 and may utilize machine learning and/or other higher level computing or processing to determine modifications to the configuration of O-eNB 705, O-CU-CP 707, O-CU-UP 709, and/or other elements of O-RAN environment 700. In some embodiments, Non-Real Time RIC 701 may generate machine learning models based on performance information associated with O-RAN environment 700 or other sources, and may provide such models to Near-Real Time RIC 703 for implementation. In some embodiments, Non-Real Time RIC 701 and/or Near-Real Time RIC 703 may be, may include, may be implemented by, and/or may be communicatively coupled to RCS 101.

O-eNB 705 may perform functions similar to those described above with respect to eNB 513. For example, O-eNB 705 may facilitate wireless communications between UE 1uu and a core network. O-CU-CP 707 may perform control plane signaling to coordinate the aggregation and/or distribution of traffic via one or more DUs 603, which may include and/or be implemented by one or more O-DUs 711, and O-CU-UP 709 may perform the aggregation and/or distribution of traffic via such DUs 603 (e.g., O-DUs 711). O-DU 711 may be communicatively coupled to one or more RUs 601, which may include and/or may be implemented by one or more O-RUs 713. In some embodiments, O-Cloud 715 may include or be implemented by one or more MECs 527, which may provide services, and may be communicatively coupled, to O-CU-CP 707, O-CU-UP 709, O-DU 711, and/or O-RU 713 (e.g., via an O1 and/or O2 interface).

Figure 8:
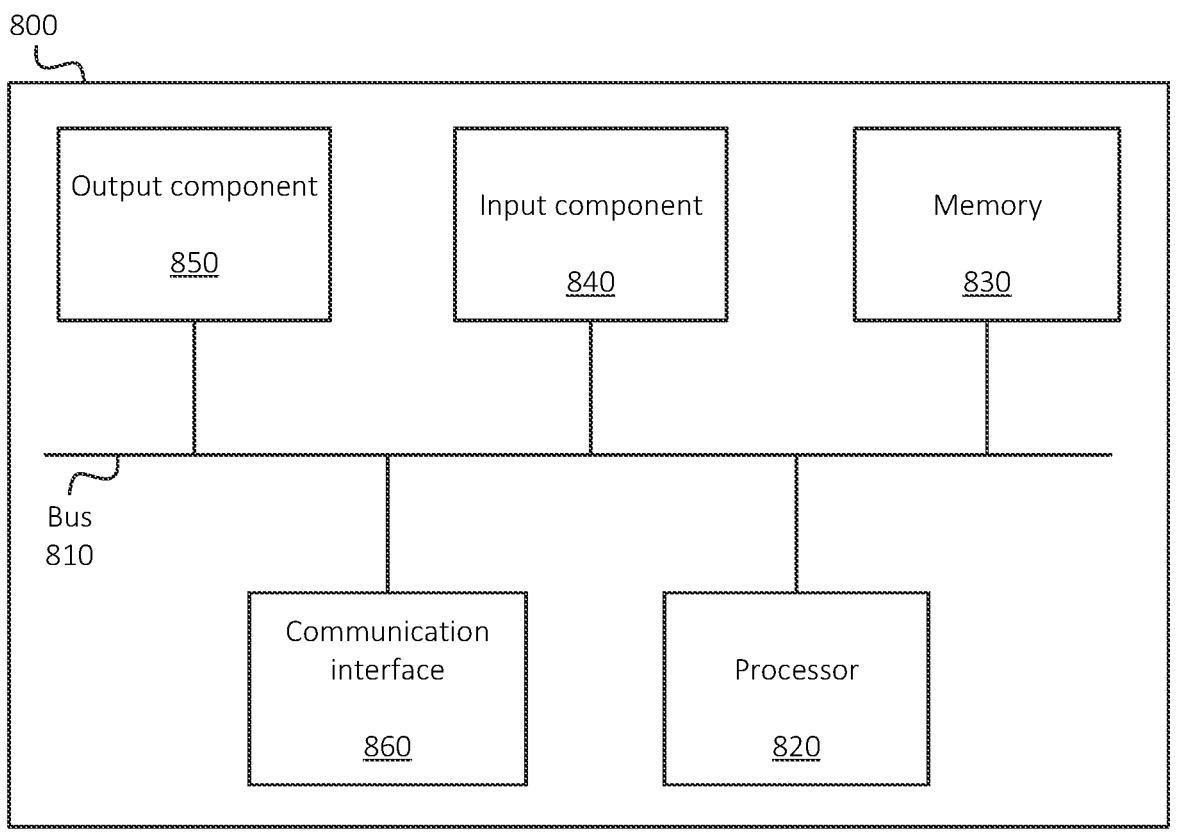
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to input component 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive information indicating that a particular User Equipment ("UE") is associated with a particular power class, out of a plurality of power classes;
identify a set of radio frequency ("RF") channel configuration parameters for a radio access network ("RAN") based on the particular power class associated with the particular UE,
wherein identifying the set of RF channel configuration parameters includes selecting a particular orthogonal frequency-division multiplexing ("OFDM") slot format, of a plurality of OFDM slot formats, based on the particular power class associated with the particular UE; and
provide the identified set of RF channel configuration parameters to the RAN, wherein the RAN utilizes the RF channel configuration parameters to configure one or more channels between the RAN and the particular UE, wherein configuring the one or more channels between the RAN and the particular UE includes implementing the particular OFDM slot format for the one or more channels between the RAN and the particular UE.

2. The device of claim 1, wherein the one or more processors are further configured to receive a set of attributes associated with the particular UE, including at least one of:
one or more Quality of Service ("QoS") parameters associated with one or more communication sessions between the particular UE and a core network that is communicatively coupled to the RAN, or
a location of the particular UE,
wherein identifying the set of RF channel configuration parameters includes selecting the particular OFDM slot format further based on the one or more QoS parameters or the location of the particular UE.

3. The device of claim 2, wherein the one or more QoS parameters include a network slice associated with the one or more communication sessions between the particular UE and the core network.

4. The device of claim 2, wherein the one or more communication sessions between the particular UE and the core network include one or more protocol data unit ("PDU") sessions between the particular UE and a user plane element of the core network.

5. The device of claim 1, wherein the particular OFDM slot format is a first OFDM slot format, wherein the first OFDM slot format includes a first arrangement, in a frequency domain, of OFDM symbols used for uplink or downlink communications between the RAN and the particular UE, and wherein a second OFDM slot format, of the plurality of OFDM slot formats, includes a different second arrangement, in the frequency domain, of OFDM symbols used for uplink or downlink communications between the RAN and the particular UE.

6. The device of claim 1, wherein the identified set of RF channel configuration parameters is a particular set of RF channel configuration parameters, wherein the one or more processors are further configured to:

generate or maintain one or more artificial intelligence/machine learning ("AI/ML") models that associate respective power classes with respective RF channel configuration parameters, wherein identifying the particular set of RF channel configuration parameters based on the particular power class associated with the particular UE includes:

comparing the particular power class, associated with the particular UE, to the power classes associated with the one or more AI/ML models; and identifying, based on the comparing, that the particular power class is associated with a particular AI/ML model of the one or more AI/ML models.

7. A non-transitory computer-readable medium, storing a plurality of processor-executable instructions to:

receive information indicating that a particular User Equipment ("UE") is associated with a particular power class, out of a plurality of power classes;

identify a set of radio frequency ("RF") channel configuration parameters for a radio access network ("RAN") based on the particular power class associated with the particular UE, wherein identifying the set of RF channel configuration parameters includes selecting a particular orthogonal frequency-division multiplexing ("OFDM") slot format, of a plurality of OFDM slot formats, based on the particular power class associated with the particular UE; and provide the identified set of RF channel configuration parameters to the RAN, wherein the RAN utilizes the RF channel configuration parameters to configure one or more channels between the RAN and the particular UE, wherein configuring the one or more channels between the RAN and the particular UE includes implementing the particular OFDM slot format for the one or more channels between the RAN and the particular UE.

8. The non-transitory computer-readable medium of claim 7, wherein the plurality of processor-executable instructions further include processor-executable instructions to receive a set of attributes associated with the particular UE, including at least one of:

one or more Quality of Service ("QoS") parameters associated with one or more communication sessions between the particular UE and a core network that is communicatively coupled to the RAN, or a location of the particular UE,

wherein identifying the set of RF channel configuration parameters includes selecting the particular OFDM slot format further based on the one or more QoS parameters or the location of the particular UE.

9. The non-transitory computer-readable medium of claim 8, wherein the one or more QoS parameters include a network slice associated with the one or more communication sessions between the particular UE and the core network.

10. The non-transitory computer-readable medium of claim 8, wherein the one or more communication sessions between the particular UE and the core network include one or more protocol data unit ("PDU") sessions between the particular UE and a user plane element of the core network.

11. The non-transitory computer-readable medium of claim 7, wherein the particular OFDM slot format is a first OFDM slot format, wherein the first OFDM slot format includes a first arrangement, in a frequency domain, of OFDM symbols used for uplink or downlink communications between the RAN and the particular UE, and wherein a second OFDM slot format, of the plurality of OFDM slot formats, includes a different second arrangement, in the frequency domain, of OFDM symbols used for uplink or downlink communications between the RAN and the particular UE.

12. The non-transitory computer-readable medium of claim 7, wherein the identified set of RF channel configuration parameters is a particular set of RF channel configuration parameters, wherein the plurality of processor-executable instructions further include processor-executable instructions to:

generate or maintain one or more artificial intelligence/machine learning ("AI/ML") models that associate respective power classes with respective RF channel configuration parameters, wherein identifying the particular set of RF channel configuration parameters based on the particular power class associated with the particular UE includes:

comparing the particular power class, associated with the particular UE, to the power classes associated with the one or more AI/ML models; and identifying, based on the comparing, that the particular power class is associated with a particular AI/ML model of the one or more AI/ML models.

13. A method, comprising:

receiving information indicating that a particular User Equipment ("UE") is associated with a particular power class, out of a plurality of power classes;

identifying a set of radio frequency ("RF") channel configuration parameters for a radio access network ("RAN") based on the particular power class associated with the particular UE, wherein identifying the set of RF channel configuration parameters includes selecting a particular orthogonal frequency-division multiplexing ("OFDM") slot format, of a plurality of OFDM slot formats, based on the particular power class associated with the particular UE; and providing the identified set of RF channel configuration parameters to the RAN, wherein the RAN utilizes the RF channel configuration parameters to configure one or more channels between the RAN and the particular UE, wherein configuring the one or more channels between the RAN and the particular UE includes implementing the particular OFDM slot format for the one or more channels between the RAN and the particular UE.

14. The method of claim 13, further comprising receiving a set of attributes associated with the particular UE, wherein the set of attributes include at least one of:

a network slice associated with one or more communication sessions between the particular UE and a core network that is communicatively coupled to the RAN, a location of the particular UE, or a power class of the particular UE.

15. The method of claim 14, wherein the one or more communication sessions between the particular UE and the core network include one or more protocol data unit ("PDU") sessions between the particular UE and a user plane element of the core network.

16. The method of claim 13, wherein the particular OFDM slot format is a first OFDM slot format, wherein the first OFDM slot format includes a first arrangement, in a frequency domain, of OFDM symbols used for uplink or downlink communications between the RAN and the particular UE, and wherein a second OFDM slot format, of the plurality of OFDM slot formats, includes a different second arrangement, in the frequency domain, of OFDM symbols used for uplink or downlink communications between the RAN and the particular UE.

17. The method of claim 13, wherein the identified set of RF channel configuration parameters is a particular set of RF channel configuration parameters, the method further comprising:

generating or maintaining one or more artificial intelligence/machine learning ("AI/ML") models that associate respective power classes with respective RF channel configuration parameters, wherein identifying the particular set of RF channel configuration parameters based on the particular power class associated with the particular UE includes:

comparing the particular power class, associated with the particular UE, to the power classes associated with the one or more AI/ML models; and identifying, based on the comparing, that the particular power class is associated with a particular AI/ML model of the one or more AI/ML models.

18. The method of claim 13, wherein providing the identified set of RF channel configuration parameters to the RAN includes providing, by a Radio Intelligent Controller ("RIC"), the identified set of RF channel configuration parameters to a Distributed Unit ("DU") of the RAN.

19. The device of claim 1, wherein providing the identified set of RF channel configuration parameters to the RAN includes providing, by a Radio Intelligent Controller ("RIC"), the identified set of RF channel configuration parameters to a Distributed Unit ("DU") of the RAN.

20. The non-transitory computer-readable medium of claim 7, wherein providing the identified set of RF channel configuration parameters to the RAN includes providing, by a Radio Intelligent Controller ("RIC"), the identified set of RF channel configuration parameters to a Distributed Unit ("DU") of the RAN.

\*　\*　\*　\*　\*